United States Patent Office 3,529,403
Patented Sept. 22, 1970

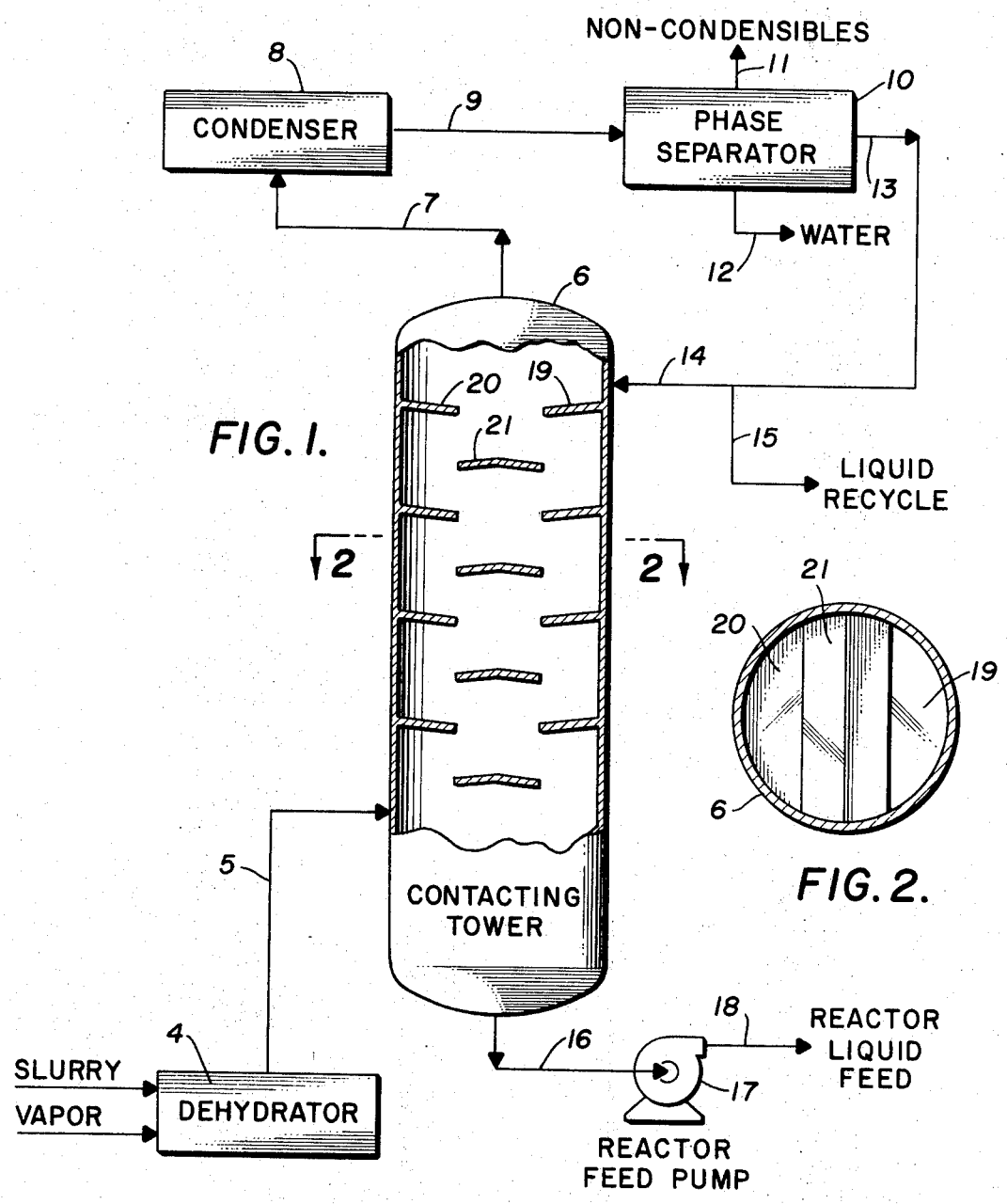

3,529,403
COUNTERCURRENT CONTACTING PROCESS
William L. Bolles, Ballwin, Mo., assignor to Monsanto Company, St. Louis, Mo., a corporation of Delaware
Continuation-in-part of application Ser. No. 663,395, Aug. 25, 1967. This application May 7, 1969, Ser. No. 822,618
The portion of the term of the patent subsequent to Aug. 12, 1986, has been disclaimed
Int. Cl. B01d 5/00
U.S. Cl. 55—82
7 Claims

ABSTRACT OF THE DISCLOSURE

In processes wherein a gaseous mixture containing a sublimed solid is cooled by countercurrent contact with a descending relatively cool liquid in a contacting tower equipped with conventional gas-liquid contacting trays, condensation of the sublimed solid on the trays normally results in serious fouling and plugging problems and eventual flooding of the tower. Those problems can be substantially eliminated by carrying out the countercurrent contact in a series of vertically spaced baffle trays so arranged and adapted that substantially all condensed solids on the trays are washed downwardly therefrom by the descending stream of liquid.

CROSS-REFERENCE TO RELATED APPLICATION

This application is a continuation-in-part of my copending application Ser. No. 663,395 which was filed on Aug. 25, 1967 and now U.S. Pat. No. 3,460,320.

BACKGROUND OF THE INVENTION

There are many useful processes in which a gaseous mixture containing a sublimed solid is desirably cooled by contact with a relatively cool liquid. However, when the mixture is cooled below the condensation temperature of the sublimed solid, most conventional liquid-gas contacting trays soon become fouled and then plugged by the condensed solids and the contacting system is eventually flooded, in some cases with disastrous results. Since the sublimed solids condense directly from the vapor (sublimed) phase to the solid state, they do not pass through a liquid phase which would flow more freely through the tower and be more simply withdrawn from the system but instead form solid crystals which typically have a high degree of adherence to surfaces on which they condense. Consequently, it has often been necessary in the past to resort to relatively expensive indirect heat-exchange systems such as those having wiped or scraped heat transfer surfaces when condensation of a sublimed solid was expected.

Examples of processes in which a gaseous mixture containing a sublimed solid is desirably cooled by contact with a stream of liquid include various hydrocarbon oxidation processes in which the oxidation reaction is carried out in the presence of a sublimable solid (e.g. a boron compound such as boric acid) which modifies the selectivity of the reaction. Such processes are conveniently employed in the oxidation of many different hydrocarbons and particularly those containing 2 to 16 carbon atoms, for example straight-chain or branched-chain aliphatic compounds such as n-butane, n-pentane, n-hexane, 2-methylpentane, n-octane, n-dodecane, 2-methylundecane, n-hexadecane, etc., and cyclic compounds such as cycloalkanes (e.g. cyclohexane, cyclooctane, cyclodecane, cyclododecane, cyclotetradecane, cyclohexadecane, etc.).

In many of such processes, water inhibits the desired oxidation reaction and is therefore advantageously removed from the hydrocarbon starting material before the latter is fed to the oxidation reactor. Unfortunately, the aforementioned boron compounds are normally most conveniently added to the reactor feed in forms which include undesirable water, usually as water of crystallization. For example, superior reaction yields are usually obtained when the oxidation is carried out in the presence of meta boric acid which normally must be added to the starting material as ortho boric acid.

To remove the excess water with minimum heat loss, it is customary to heat a mixture of the hydrocarbon and ortho boric acid to drive off a gaseous mixture of the hydrocarbon and water (leaving a suitable reaction mixture of hydrocarbon and meta boric acid), remove the evaporated water from the system by condensing the gaseous mixture and decanting the condensate, and recombine the decanted hydrocarbon with the reaction feed after reheating it by countercurrent contact with the evaporated gaseous mixture. However, the evaporated gaseous mixture also normally contains a small amount of sublimed ortho boric acid that condenses to the solid state during cooling of the gaseous mixture by contact with the condensed hydrocarbon. When the cooling is carried out in a countercurrent contacting tower equipped with trays of a conventional type, e.g. sieve or bubblecap trays, the condensed boric acid normally accumulates in downcomers and perforations, behind tray weirs, etc. and soon results in flooding of the tower, often within a matter of hours. Even when the condensed solids do not accumulate in critical areas of the tower so as to cause flooding, they gather in large deposits which can become dislodged after long periods of accumulation and plug liquid tower outlets and/or lines and pumps by which the tower bottoms are conducted to the oxidation reactor. Accordingly, a process improvement by which such problems might be overcome is highly desirable and it is an object of this invention to provide such an improvement.

SUMMARY OF THE INVENTION

It has now been discovered that the aforedescribed objective can be substantially completely achieved by the use of a series of contacting trays of a baffle type so arranged and adapted that condensed solids thereon are washed downwardly from each tray by the stream of liquid descending through the tower. Thus, in a process wherein a gaseous mixture containing a sublimed solid is cooled by countercurrent contact with a descending stream of relatively cool liquid in a series of vertically spaced liquid-gas contacting trays and wherein at least a portion of the sublimed solid in the cooled gaseous mixture is condensed to the solid state on said trays, this invention provides an improvement which comprises carrying out the countercurrent contact in a series of baffle trays so arranged and adapted that substantially all condensed solids on said trays are washed downwardly therefrom by the descending stream of liquid. The invention is particularly useful in a process of the aforementioned type in which the gaseous mixture contains a hydrocarbon having 2 to 16 carbon atoms, a sublimed boron compound and water, in which at least a portion of the sublimed boron compound is condensed to the solid state on the trays, in which an overhead mixture containing uncondensed hydrocarbon and water is withdrawn from contact with the descending stream of relatively cool liquid, in which hydrocarbon and water are condensed from the overhead mixture and in which condensed hydrocarbon is returned in the stream of relatively cool liquid.

DESCRIPTION OF THE DRAWING AND SPECIFIC EMBODIMENTS OF THE PROCESS

In the attached drawing, FIG. 1 is a schematic flow diagram illustrating a continuous embodiment of the invention utilizing a baffle tray-containing contacting tower which is shown in elevation in FIG. 1. FIG. 2 is a plan section view of the tower taken along section line 2—2 in FIG. 1.

Referring to the drawing and describing a continuous process embodiment as shown therein on an hourly basis, a slurry containing 10 parts of ortho boric acid, 29 parts of cyclohexane and 1 part water was sparged in a stirred-tank dehydrator 4 with a hot (158° C.) gaseous stream containing 343 parts of cyclohexane, 52 parts of nitrogen, 5 parts of water and 4 parts benzene. The gaseous effluent from dehydrator 4, which contained 293 parts of cyclohexane, 52 parts of nitrogen, 9 parts of water and approximately 0.5 part of sublimed ortho boric acid, was conducted through tower inlet line 5 at 150° C. and flowed upwardly through contacting tower 6 which was maintained at a bottoms pressure of 116 p.s.i.g. and an overhead pressure of 114 p.s.i.g. 80 parts of the cyclohexane in the gaseous mixture rising through tower 6 were condensed by contact with descending liquid tower reflux (described hereinafter) and the remainder flowed out of tower 6 through line 7 in an overhead mixture which contained 213 parts of cyclohexane, 52 parts of nitrogen and 9 parts water. The overhead mixture was cooled to 40° C. in condenser 8 and then transported through line 9 to phase separator 10 from which non-condensables including 52 parts of nitrogen were withdrawn through line 11 and an aqueous phase containing 9 parts of water was withdrawn through line 12. The remaining organic phase was withdrawn through line 13 and divided into a liquid stream 15 which may be recycled in part to dehydrator 4 and/or otherwise reheated and fed to cyclohexane oxidation (not shown) and a tower reflux stream containing 140 parts of liquid cyclohexane which was returned to the upper portion of tower 6 through line 14. By countercurrent contact between the upwardly-flowing gaseous mixture and the descending relatively cool liquid reflux in tower 6, 80 parts of cyclohexane were condensed from the gaseous mixture as aforesaid and combined with refluxed liquid cyclohexane to provide a tower bottoms stream containing 220 parts of cyclohexane. At a temperature of 145° C., the tower bottoms stream was withdrawn via line 16 and fed by reactor feed pump 17 through line 18 to cyclohexane oxidation.

When the aforedescribed countercurrent contacting process was carried out in a contacting tower equipped with conventional sieve-type trays of a two-pass design having overflow weirs and segmental downcomers and properly designed for the actual flows of gas and liquid, the reactor feed (tower bottoms) pump 17 was frequently plugged by solids and the tower flooded within 8–16 hours of startup. Process stream analysis indicated that of the approximately 0.5 part of sublimed ortho boric acid in the gaseous tower feed, between 0.1 and 0.2 part were accumulating in the tower. To maintain the level of accumulated solids on the trays at an operational level, the contacting process was interrupted every four hours to wash down the trays with large quantities of water. However, disruption of the process for the washing cycle resulted in sharp upsets and substantially lower yields in the downstream cyclohexane oxidation system because of the higher water content and greater temperature fluctuations of the liquid bottoms from the contacting tower.

After the sieve-type trays in tower 6 had been replaced with baffle trays 19–21 as shown in FIGS. 1 and 2, the aforedescribed countercurrent contacting process was continuously carried out for periods up to eight weeks and longer with no significant problems of tray fouling or tower flooding and without any plugging of the reactor feed (tower bottoms) pump, indicating that by the process of this invention, downward washing of condensed solids from the baffle trays had been continuous and substantially complete and had thereby eliminated all significant solids accumulation in the tower. The specific baffle trays in the tower were of an inclined two-pass segmental type having their lower peripheral portions substantially unobstructed (by weirs or otherwise) against downward washing of solids from their upper surfaces. The trays also had no downcomers or perforations in which condensed solids might otherwise accumulate.

In another continuous process embodiment wherein the hydrocarbon is cyclododecane, the gaseous effluent from dehydrator 4 contains 72 parts of cyclododecane, 100 parts of nitrogen, 24 parts of water and 5 parts of sublimed ortho boric acid. The temperature of the gaseous effluent as it is fed to the tower is 160° C. and the tower pressure is about 5 p.s.ig. 19 parts of the cyclododecane in the gaseous mixture are condensed by contact with reflux in the tower and the remainder flows out of the tower in an overhead mixture which contains 53 parts of cyclododecane, 100 parts of nitrogen and 24 parts of water. The overhead mixture is cooled to 68° C. in the condenser and liquid cyclododecane from the phase separator is returned to the tower for cooling of the gaseous tower feed. The sublimed boric acid in the gaseous effluent condenses to the solid state in the tower in quantities which would soon cause fouling of conventional (e.g. sieve or bubblecap) liquid-gas contacting trays and flooding of the tower, but when the tower is equipped with baffle trays as described hereinbefore and shown in the drawing, the process can be carried out for much longer periods of time (e.g. up to several months and longer) without significant problems of tray fouling, tower flooding of pump plugging due to solids accumulation in the tower.

It will be appreciated that various types of baffle trays can be satisfactorily used in the process of this invention so long as they are so adapted and arranged in the contacting tower that condensed solids are washed downwardly therefrom by the descending liquid stream in the tower. For example, the tray arrangement can be single-, double- or multi-flow and the upper surfaces of the trays may be horizontal in some cases, although a moderate slope such as 5–12 percent is usually preferable. Also, the trays can be segmental or of the disk-and-donut type, with or without uninterrupted vertical drop lines. The choice of a specific type of baffle tray is generally dependent on the desired solids velocity and length of flow path on the trays, the expected solids loading of the trays, etc. The preferred number and spacing of trays in the series are normally determined by other process considerations such as the desired degree of cooling of the upward-flowing gaseous mixture by the descending liquid stream, etc. Materials of construction can be any of those normally suitable for use with the particular gas and liquid to be contacted.

Although the invention has been described with reference to process embodiments with specific stream constituents, sublimable solids, baffle tray structures, etc., it will be recognized that many modifications and variations thereof may be employed without departing from the spirit and scope of the invention. Accordingly, it is to be understood that the invention is not limited to such embodiments except as it is defined in the appended claims.

I claim:
1. In a process wherein a gaseous mixture containing a hydrocarbon having 11 to 16 carbon atoms, a sublimed boron compound and water is cooled by countercurrent contact with a descending stream of relatively cool liquid in a series of vertically spaced liquid-gas contacting trays, at least a portion of the sublimed boron compound is condensed to the solid state on said trays, an overhead mixture containing uncondensed hydrocarbon and water is withdrawn from contact with said stream, hydrocarbon and water are condensed from said overhead mixture, and condensed hydrocarbon is returned in said stream, the improvement which comprises carrying out said countercurrent contact in a series of baffle trays so arranged and adapted that substantially all condensed solids on said trays are washed downwardly therefrom by the descending stream of liquid.

2. A process as defined in claim 1, in which the boron compound is ortho boric acid.

3. A process as defined in claim 1, in which the hydrocarbon is a cycloalkane.

4. A process as defined in claim 1, in which the hydrocarbon is cyclododecane.

5. A process as defined in claim 1, in which a peripheral portion of the upper surface of each of the baffle trays is substantially unobstructed against downward washing of solids from said upper surface.

6. A process as defined in claim 5, in which said upper surface is sloped downwardly toward said peripheral portion.

7. A process as defined in claim 1, in which the baffle trays are segmental.

References Cited

UNITED STATES PATENTS 2,742,977   4/1956   Williams et al. -------- 55—82

FOREIGN PATENTS 494,710   7/1953   Canada.

REUBEN FRIEDMAN, Primary Examiner

C. N. HART, Assistant Examiner

U.S. Cl. X.R.

260—676